United States Patent
Park

(10) Patent No.: US 10,412,276 B2
(45) Date of Patent: Sep. 10, 2019

(54) CAMERA MODULE, AND VEHICLE CAMERA

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 23 days.

(21) Appl. No.: 15/569,679

(22) PCT Filed: Apr. 22, 2016

(86) PCT No.: PCT/KR2016/004190
§ 371 (c)(1),
(2) Date: Oct. 26, 2017

(87) PCT Pub. No.: WO2016/175505
PCT Pub. Date: Nov. 3, 2016

(65) Prior Publication Data
US 2018/0124292 A1    May 3, 2018

(30) Foreign Application Priority Data

Apr. 27, 2015    (KR) .......................... 10-2015-0059188

(51) Int. Cl.
*H04N 5/225*    (2006.01)
*G03B 17/02*    (2006.01)
*H01R 12/62*    (2011.01)

(52) U.S. Cl.
CPC ........... *H04N 5/2252* (2013.01); *G03B 17/02* (2013.01); *H01R 12/62* (2013.01); *H04N 5/2253* (2013.01);
(Continued)

(58) Field of Classification Search
CPC . H04N 5/379; H04N 5/369; H04N 2005/2255
(Continued)

(56) References Cited

U.S. PATENT DOCUMENTS

2005/0046740 A1*   3/2005   Davis ................... H04N 5/2254
                                                        348/373
2006/0228103 A1*   10/2006  Go ....................... G03B 7/09908
                                                        396/268
(Continued)

FOREIGN PATENT DOCUMENTS

KR      20-0246806 Y1    10/2001
KR      10-0770682 B1    10/2007
KR      10-2013-0071078 A   6/2013

OTHER PUBLICATIONS

International Search Report in International Application No. PCT/KR2016/004190, filed Apr. 22, 2016.

*Primary Examiner* — Twyler L Haskins
*Assistant Examiner* — Dwight Alex C Tejano
(74) *Attorney, Agent, or Firm* — Saliwanchik, Lloyd & Eisenschenk

(57) ABSTRACT

The present embodiment may comprise a lens unit; a first housing coupled to the lens unit; a first substrate unit which has an image sensor mounted thereon and is accommodated in the first housing; a second housing which is coupled to the first housing and has flexibility on at least a partial area thereof; and a second substrate unit which is accommodated in the second housing and is electrically connected to the first substrate unit.

18 Claims, 2 Drawing Sheets

(52) U.S. Cl.
CPC ....... *H04N 5/2254* (2013.01); *H01R 2201/18* (2013.01)

(58) Field of Classification Search
USPC .......................................................... 348/45
See application file for complete search history.

(56) References Cited

U.S. PATENT DOCUMENTS

| | | | |
|---|---|---|---|
| 2008/0100732 A1* | 5/2008 | Minamio | H04N 5/2251 348/294 |
| 2008/0170141 A1* | 7/2008 | Tam | H04N 5/2251 348/294 |
| 2009/0301755 A1 | 12/2009 | Shintani | |
| 2010/0201794 A1* | 8/2010 | Kido | A61B 1/00124 348/65 |
| 2012/0197081 A1* | 8/2012 | Kimura | A61B 1/00124 600/110 |
| 2013/0153751 A1* | 6/2013 | Isogai | H01L 27/14618 250/208.1 |
| 2014/0249368 A1* | 9/2014 | Hu | H04N 5/2253 600/109 |
| 2014/0311794 A1 | 10/2014 | Standing et al. | |
| 2015/0077531 A1* | 3/2015 | Adair | H04N 5/3765 348/76 |

* cited by examiner

CAMERA MODULE, AND VEHICLE CAMERA

CROSS-REFERENCE TO RELATED APPLICATIONS

This application is the U.S. national stage application of International Patent Application No. PCT/KR2016/004190, filed Apr. 22, 2016, which claims priority to Korean Application No. 10-2015-0059188, filed Apr. 27, 2015, the disclosures of each of which are incorporated herein by reference in their entirety.

TECHNICAL FIELD

The teachings in accordance with exemplary and non-limiting embodiments of this invention relate generally to a camera module and a vehicle camera.

BACKGROUND ART

In general, the current trend is that, concomitant with an increased demand on driver convenience and safety in the automobile industries, new technologies are variously grafted, and particularly, the technology using a camera is fused with a software technology and briskly applied to automobile industries. Efforts are being waged and required to minimize the size of cameras for being mounted on a vehicle.

A vehicle camera is configured with a lens, an inner circuit and a mechanical structure to support the lens and the inner circuit, and when a plurality of PCBs is overlapped to increase the number of layers during the design process, the size of X axis or Y axis direction may be reduced while the size of Z axis direction (direction parallel with an optical axis) may be increased.

Furthermore, a camera to be installed at a particular position must be reduced in size to within a space allowed in the design of a vehicle, or a structure of a vehicle may be changed if necessary, such that it is actually difficult for a same camera to be interchangeably used at another position, and therefore, to this end, there may be generated an inevitable case of changing a design of a vehicle.

DETAILED DESCRIPTION OF THE INVENTION

Technical Subject

In order to solve the abovementioned problems/disadvantages, an exemplary embodiment of the present invention provides a camera module reduced in size at Z axis direction in addition to X axis and Y axis direction. Furthermore, an exemplary embodiment of the present invention provides a camera module that can be installed at various positions.

Technical Solution

In one general aspect of the present invention, there is provided a camera module, the camera module comprising:
a lens unit;
a first housing coupled to the lens unit;
a first substrate unit which has an image sensor mounted thereon and is accommodated in the first housing;
a second housing which is coupled to the first housing and has flexibility on at least a partial area thereof; and
a second substrate unit which is accommodated in the second housing and is electrically connected to the first substrate unit.

Preferably, but not necessarily, the first housing may include a through hole formed at a part of one lateral surface, and a cross-sectional area of an inner space at the second housing may correspond to that of the through hole.

Preferably, but not necessarily, the first housing may include a through hole formed at one surface, and the second housing may include an extension unit extended from a distal end to an outside, and the second housing may pass through the through hole to allow a part of the second housing to be positioned at an inside of the first housing, and the extension unit may contact an inner lateral surface of a surrounding of the through hole at the first housing.

Preferably, but not necessarily, the second housing may be coupled only to a part of the lateral surface of one side of the first housing.

Preferably, but not necessarily, the camera module may further comprise a first electrical conductor electrically connected to the second substrate unit.

Preferably, but not necessarily, each of the first substrate unit and the second substrate unit may be an RPCB (Rigid Printed Circuit Board), and the first electrical conductor may be an FPCB (Flexible Printed Circuit board).

Preferably, but not necessarily, each of the first substrate unit, the second substrate and the first electrical conductor may be an FPCB (Flexible Printed Circuit board).

Preferably, but not necessarily, the first substrate unit may be so disposed as to meet an optical axis of the lens unit, and the second substrate unit may be so disposed as to be distanced from an optical axis of the lens unit.

Preferably, but not necessarily, the camera module may further comprise:
a third substrate unit distanced from the second substrate unit and disposed at an inside of the second housing;
a second electrical conductor electrically connected to the second substrate unit and the third substrate unit;
a fourth substrate unit distanced from the third substrate unit and disposed at an inside of the second housing; and
a third electrical conductor electrically connected to the third substrate unit and the fourth substrate unit.

Preferably, but not necessarily, the first housing may include an opening unit so formed as to pass through a part of an upper plate, and a first screw thread formed at a lateral surface of the first housing forming the opening unit, and the lens unit may include a second screw thread coupled to the first screw thread.

Preferably, but not necessarily, the first substrate unit may be coupled to an inner surface of the upper plate of the first housing.

Preferably, but not necessarily, the second housing may include a bendable bending unit.

Preferably, but not necessarily, the bending unit may include a concave/convex unit formed by being bent several times.

Preferably, but not necessarily, an electromagnetic wave shield unit may be interposed between an inner surface of the housing and the second substrate unit.

Preferably, but not necessarily, the electromagnetic wave shield unit may include a mesh-structured filter or foil of metallic material.

Preferably, but not necessarily, the second housing may be formed at least at a partial area thereof with a ferrite to absorb an electromagnetic wave, or may be coated at an inner surface thereof with a ferrite.

Preferably, but not necessarily, the camera module may further comprise a cable electrically conducted to the second substrate unit and extended to outside of the second housing.

In another general aspect of the present invention, there is provided a camera module, the camera module comprising:
a lens unit;
a first housing including an opening unit accommodating at least a part of the lens unit and a through hole passing through the opening unit distanced from the opening unit;
a first substrate unit disposed at an inside of the first housing;
an image sensor mounted at the first substrate unit;
a second housing coupled to the first housing; and
a second substrate unit disposed at an inside of the second housing and electrically connected to the first substrate unit, wherein
an inner space of the first housing and an inner space of the second housing are communicated through the through hole, and the second housing has flexibility at least at a partial area thereof.

Preferably, but not necessarily, the size of the through hole may be smaller than that of the opening unit.

In still another general aspect of the present invention, there is provided a vehicle camera, the vehicle camera comprising:
a lens unit;
a first housing coupled to the lens unit;
a first substrate unit which has an image sensor mounted thereon and is accommodated in the first housing;
a second housing which is coupled to the first housing and has flexibility on at least a partial area thereof; and
a second substrate unit which is accommodated in the second housing and is electrically connected to the first substrate unit.

Advantageous Effects of the Invention

An entire length can be reduced to all directions of X axis, Y axis and Z axis through an exemplary embodiment of the present invention to thereby minimize the size of the camera module.

Furthermore, the camera module according to an exemplary embodiment of the present invention can be interchangeably mounted on various positions.

Still furthermore, a phenomenon of an electromagnetic wave being emitted to outside can be prevented by an electromagnetic shield or absorption means of an exemplary embodiment of the present invention.

BEST MODE

Figure 1:
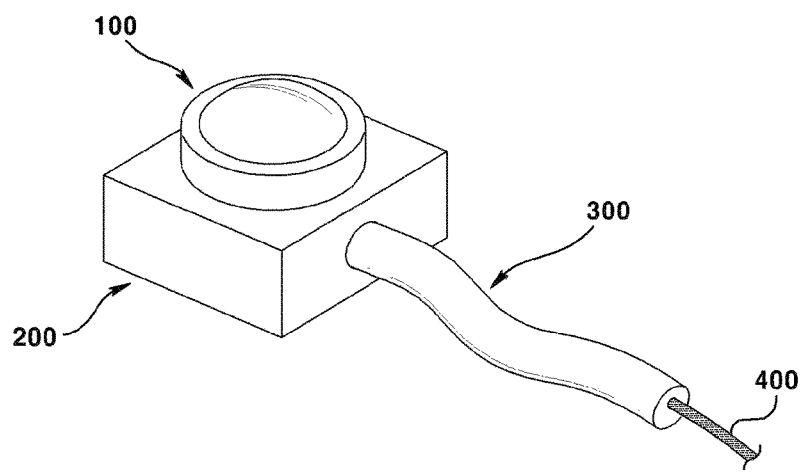
FIG. 1 is a perspective view illustrating a camera module according to a first exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled", and "connected" may mean that two or more elements do not contact each other but are indirectly joined together via another element or intermediate elements.

First Exemplary Embodiment

Hereinafter, a camera module according to a first exemplary embodiment of the present invention will be described with the accompanying drawing.

FIG. 1 is a perspective view illustrating a camera module according to a first exemplary embodiment of the present invention.

Referring to FIG. 1, the camera module according to a first exemplary embodiment of the present invention may include a lens unit (100), a first housing (200) and a second housing (300). The lens unit (100) may be coupled to the first housing (200). The second housing (300) may be connected to the first housing (200). The camera module may further include a cable (400) connected to the second housing (300).

Figure 2:
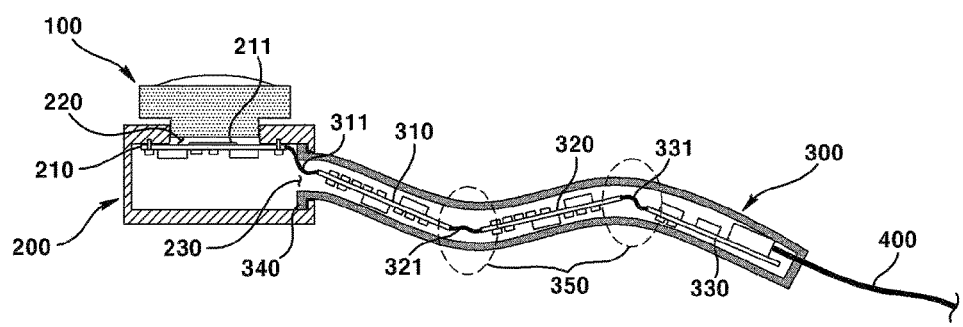
FIG. 2 is a cross-sectional view illustrating a camera module according to a first exemplary embodiment of the present invention.

FIG. 2 is a cross-sectional view illustrating a camera module according to a first exemplary embodiment of the present invention.

Referring to FIG. 2, the lens unit (100) may include at least one lens. The lens unit (100) may include a plurality of lenses and a lens barrel accommodating the plurality of lenses. The lens unit (100) may be coupled to the first housing (200). In other words, the lens unit (100) and the first housing (200) may be arranged to Z direction and may be mutually coupled.

The first housing (100) may take a cylindrical shape with an upper surface being partially opened. That is, the first housing (100) may be formed with an opening unit (220) at a partial area thereof. The first housing (100) may be formed with an inner space therein. The first housing (100) may take a cuboid shape. Furthermore, the first housing (100) may be formed with various polyhedron shapes such as a cylindrical shape, and a poly prism shape. However, the shape of the first housing (100) is not limited thereto. The first housing (100) may be coupled at one side to a second housing (300).

The first housing (100) may accommodate a first substrate unit (210). The first substrate unit (210) may be mounted with an image sensor detecting a light having passed the lens unit (100). The first substrate unit (210) may meet an optical axis of the lens unit (100). The first substrate unit (210) may be so disposed as to be vertical to the optical axis of the lens unit (100). Furthermore, the first substrate unit (210)

arranged with the image sensor (211) at an upper surface may be also vertically arranged to the optical axis. The first substrate unit (210) may be accommodated at an inner space of the first housing (200). The first substrate unit (210) may be coupled to an inner surface (ceiling) of an upper plate of the first housing (200) about the opening unit (220) by coupling means. The first substrate unit (210) may be formed with a through hole.

The first housing (200) may be formed at an inner surface of the upper plate with an insertion hole. The coupling means may include a nut, a bolt or a rivet. Thus, the first substrate unit (210) may be coupled to the first housing (200) by allowing the coupling means such as the nut, the bolt or the rivet to pass through the through hole and by allowing being inserted into an insertion hole. The first substrate unit (210) and the image sensor (211) may be fixed inside the inner space of the first housing (200) lest the first substrate unit (210) and the image sensor (211) be moved.

The opening unit (220) may be coupled with a lower end of the lens from an upward direction to a downward direction. The opening unit (220) and the lens unit (100) may be screw-connected. That is, the opening unit (220) may be formed with a first screw thread.

Furthermore, the lens unit (100) may be formed with a second screw thread coupled to the first screw thread. A surface facing an optical axis from the opening unit (220) of the first housing (200) and a bottom external surface of the lens unit (100) may be formed with mutually corresponding screw threads which are in turn screw-connected. However, the first housing (200) and the lens unit (100) may be coupled by various coupling methods in addition to the screw-connection.

The second housing (300) may be connected to the first housing (200). One side of the first housing (200) may be formed with a through hole (230) to allow one end of the second housing (300) to pass therethrough. One end of the second housing (300) may be accommodated into an inside of the first housing (100). At this time, the one end of the second housing (300) may be formed with an extension unit (340) enlarged in an inner space of the first housing (200). The extension unit (340) may be coupled by being in contact with a wall surface inside of the first housing (200) surrounding the through hole (230). Through this structure, the second housing (300) can be prevented from being separated from the first housing (200).

The second housing (300) may be coupled to an outside of the first housing (200) using a separate coupling means. An epoxy resin may be inserted and sealed therein between the first and second housings (200, 300). In this case, outside foreign objects, moisture or humidity can be prevented from penetrating between the first and second housings (200, 300). Connection between the first and second housings (200, 300) may be variably implemented. The second housing (300) may include an inner space. The inner space of the second housing (300) may communicate with an inner space of the first housing (200).

Now, referring to FIG. 2, the inner space of the second housing (300) may be accommodated by a second substrate unit (310) and a third substrate unit (320). The second substrate unit (310) may be disposed by being distanced from an optical axis of the lens unit (100). The second substrate unit (310) may be electrically connected to the first substrate unit (210) accommodated into the first housing (200) by a first electric conductor (311). At this time, the first electric conductor (311) may be an FPCB (Flexible Printed Circuit Board). The first electric conductor (311) connecting the first and second substrate units (210, 310) may pass through the through hole (230) of the first housing (200).

The second housing (300) may be disposed therein with a third substrate unit (320) and a fourth substrate unit (330). The third substrate unit (320) may be electrically connected to the second substrate unit (310) using a second electric conductor (321). The fourth substrate unit (330) may be electrically connected to the third substrate unit (320) using a third electric conductor (331). A connector or a wire may be used as a means to electrically connect the first, second, third and fourth substrate units (210 to 330) replacing the first, second and third electric conductors (311 to 331).

An inner space of the second housing (300) may be arranged with a plurality of additional substrate units such as fifth and sixth substrate units (not shown). In this case, a fourth electric conductor (not shown) electrically connecting the fourth substrate unit (330) and the fifth substrate unit, and a fifth electric conductor electrically conducting the fifth substrate unit and the six substrate unit may be disposed.

An area where the PCBs are mutually connected, that is, a part of the second housing (300) corresponding to positions of the second electric conductor (321) and the third electric conductor (331) may be disposed with a flexibility unit (350). The flexibility unit (350) may be formed with a soft material or a flexible material. The second housing (300) may house the second substrate unit (310) and the third substrate unit (320), both of which are rigid PCBs. At this time, the second substrate unit (310) and the third substrate unit (320) may be electrically connected by a bendable second electric conductor (321). Thus, the second housing (300) may not bend at an area corresponding to positions of the second substrate unit (310) and the third substrate unit (320). Meantime, the second housing (300) may be bent at an area positioned by the second electric conductor (321). Meantime, the second housing (300) may be bent at the third electric conductor (331) connecting the third and fourth substrate units (320, 330).

The first substrate to fourth substrate units (210-330) may be all of RPCBs (RPCBs). However, at least one of the first substrate to fourth substrate units (210-330) may be of FPCBs. In the case of all the substrate units accommodated into the second housing (300) being of FPCBs, the second housing (300) may be formed with flexibility across all sections.

The camera modules according to the exemplary embodiments thus discussed are flexible and bendable, such that the camera module can be interchangeably installed at various places because of no limitations in terms of volume at installation positions.

One end of the fourth substrate unit (330) accommodated into the second housing (300) may be connected with a cable (400) to allow an electric connection with an outside power source or an outside electric device. The cable (400) may be connected at one end to the fourth substrate unit (330) by being accommodated into the second housing (300). The cable (400) may be extended to an outside of the second housing (300).

Hereinafter, an operation of camera module according to an exemplary embodiment of the present invention will be described with reference to the accompanying drawings.

First, a user installs a camera module according to an exemplary embodiment of the present invention at a desired position. At this time, the position where the camera module according to an exemplary embodiment of the present invention is installed may be at least one of rear side, front side and lateral side of a vehicle.

As noted above, when the camera module according to an exemplary embodiment of the present invention is installed on a vehicle, the camera module may be called a "vehicle camera".

The camera module according to the present exemplary embodiment of the present invention may be reduced in size, because the PCB may be accommodated into an inner space of the first housing (200), not in a plural number, but only in a single number of the first substrate unit (210). The camera module according to an exemplary embodiment of the present invention may be installed at various positions because of miniaturized size. That is, the camera module according to an exemplary embodiment of the present invention can be installed even in a restricted space because of reduced size.

Now, a user connects the cable (400) to an outside power source. In this case, the first to fourth substrate units (210, 310, 320, 330) accommodated into the first and second housings (200, 300) may be supplied with an electric power source. At this time, a light received by the image sensor (211) may be converted to an electric signal to be transmitted to an outside electric device through the first to fourth substrate units (210, 310, 320, 330) and the first to third electric conductors (311, 321, 331) connected to the the first to fourth substrate units (210, 310, 320, 330) and through the cable (400). That is, when the camera module according to an exemplary embodiment of the present invention is installed at a rear side of a vehicle, an image at the rear side of the vehicle may be outputted to a display unit mounted at an inside of the vehicle. If the camera module according to an exemplary embodiment of the present invention is to be installed at a more restricted area, the spatial restriction may be overcome by bending the second housing (300) using the flexibility unit (350).

Second Exemplary Embodiment

Hereinafter, a camera module according to a second exemplary embodiment of the present invention will be described with the accompanying drawing.

Figure 3:
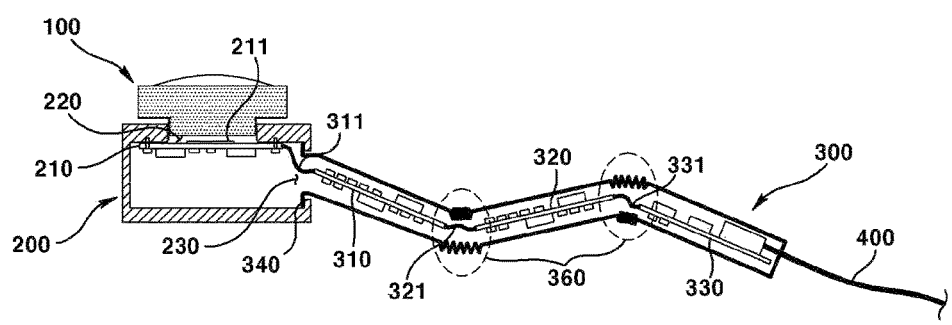
FIG. 3 is a cross-sectional view illustrating a camera module according to a second exemplary embodiment of the present invention.

FIG. 3 is a cross-sectional view illustrating a camera module according to a second exemplary embodiment of the present invention.

Referring to FIG. 3, the camera module according to a second exemplary embodiment of the present invention may include a lens unit (100), a first housing (200) and a second housing (300). However, description of the lens unit (100) and the second housing (300) may be applied by inferring from the description of the lens unit (100) and the first housing (200) of the first exemplary embodiment discussed above.

The second housing (300) may be formed of a rigid material at least for some parts thereof. At this time, a part of the second housing (300) may be disposed with a bending unit (360). The second housing (300) may be bent at the bending unit (360). The second housing (300) may be folded at the bending unit (360).

The bending unit (360) may be formed at the second housing (300). The bending unit (360) may include a concave/convex unit by being folded or bent several times. The being unit (360) may be changeable in length thereof in response to folding or unfolding of the concave/convex unit. The second housing (300) may be folded or unfolded several times through the bending unit (360).

Third Exemplary Embodiment

Hereinafter, a camera module according to a third exemplary embodiment of the present invention will be described with the accompanying drawing.

Figure 4:
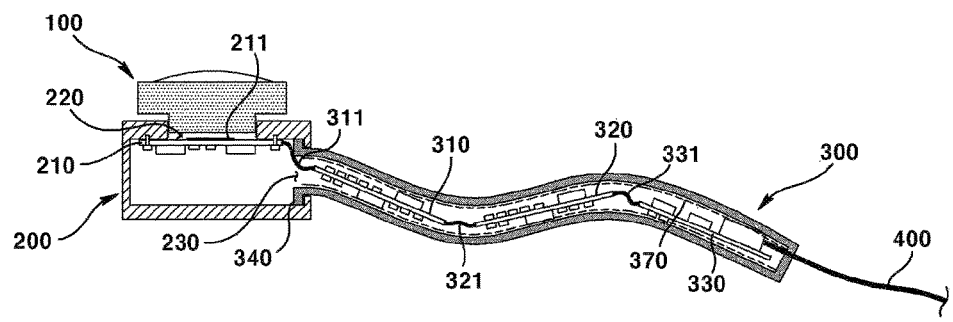
FIG. 4 is a cross-sectional view illustrating a camera module according to a third exemplary embodiment of the present invention.

FIG. 4 is a cross-sectional view illustrating a camera module according to a third exemplary embodiment of the present invention.

Referring to FIG. 4, the camera module according to a third exemplary embodiment of the present invention may include a lens unit (100), a first housing (200) and a second housing (300). However, description of the lens unit (100) and the first housing (200) may be applied by inferring from the description of the lens unit (100) and the first housing (200) of the first exemplary embodiment discussed above.

Referring to FIG. 4, the camera module according to a third exemplary embodiment of the present invention may include an electromagnetic wave shield unit (370) or an electromagnetic absorber (not shown) arranged at an inside of the second housing (300). The electromagnetic wave shield unit (370) may include the PCBs such as the second substrate unit (310), the third substrate unit (320) and the fourth substrate unit (330), a mesh-structured filter or foil of metallic material encompassing the first electric conductor (311), the second electric conductor (321) and the third electric conductor (331).

The electromagnetic wave shield unit (370) can shield the electromagnetic wave emitted from substrate units such as the second substrate unit (310) and the third substrate unit (320), and the first electric conductor (311), the second electric conductor (321) and the third electric conductor (331). A wire mesh may be used for the filter as one type of mesh-structure.

Meantime, the second housing (300) may be formed at an inner wall with a ferrite. Alternatively, the second housing (300) may be formed by including the ferrite per se. In this case, the ferrite can absorb the electromagnetic wave emitted from the substrate units (210, 310, 320, 330). That is, the second housing (300) can absorb the electromagnetic wave emitted from the second, third and fourth substrate units (310, 320, 330) and/or the first, second and third electric conductors (311, 321, 331).

As mentioned above, the camera module according to a third exemplary embodiment of the present invention can prevent the electromagnetic wave emitted from inside of the camera module through electromagnetic wave shield and prevent a phenomenon of interference from outside configurations.

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A camera module, the camera module comprising:
   a lens unit;
   a first housing coupled to the lens unit;
   a first substrate unit that has an image sensor mounted thereon and is disposed in the first housing;
   a second housing that is coupled to the first housing and has flexibility on at least a partial area thereof; and
   a second substrate unit that is disposed in the second housing and is electrically connected to the first substrate unit;
   wherein the first housing includes a through hole formed at a part of one lateral surface, and a cross-sectional area of an inner space at the second housing corresponds to a cross-sectional area of the through hole.

2. The camera module of claim 1, wherein the second housing includes an extension unit extended from a distal end to an outside, and the second housing passes through the through hole to allow a part of the second housing to be positioned at an inside of the first housing, and the extension unit contacts an inner lateral surface of the through hole at the first housing.

3. The camera module of claim 1, wherein the second housing is coupled only to a part of the lateral surface of one side of the first housing.

4. The camera module of claim 1, comprising a first electrical conductor electrically connected to the second substrate unit.

5. The camera module of claim 4, wherein each of the first substrate unit and the second substrate unit is an RPCB (Rigid Printed Circuit Board), and the first electrical conductor is an FPCB (Flexible Printed Circuit board).

6. The camera module of claim 4, wherein each of the first substrate unit, the second substrate and the first electrical conductor is an FPCB (Flexible Printed Circuit board.

7. The camera module of claim 1, wherein the first substrate unit is so disposed as to meet an optical axis of the lens unit, and the second substrate unit is so disposed as to be distanced from an optical axis of the lens unit.

8. The camera module of claim 1, comprising:
   a third substrate unit distanced from the second substrate unit and disposed at an inside of the second housing;
   a second electrical conductor electrically connected to the second substrate unit and the third substrate unit;
   a fourth substrate unit distanced from the third substrate unit and disposed at an inside of the second housing; and
   a third electrical conductor electrically connected to the third substrate unit and the fourth substrate unit.

9. The camera module of claim 1, wherein the first housing includes an opening unit so formed as to pass through a part of an upper plate, and a first screw thread formed at a lateral surface of the first housing forming the opening unit, and the lens unit includes a second screw thread coupled to the first screw thread.

10. The camera module of claim 1, wherein the first substrate unit is coupled to an inner surface of the upper plate of the first housing.

11. The camera module of claim 1, wherein the second housing includes a bendable bending unit.

12. The camera module of claim 11, wherein the bending unit includes a concave/convex unit formed by being bent several times.

13. The camera module of claim 1, wherein an electromagnetic wave shield unit is interposed between an inner surface of the housing and the second substrate unit.

14. The camera module of claim 13, wherein the electromagnetic wave shield unit includes a mesh-structured filter or foil of metallic material.

15. The camera module of claim 1, wherein the second housing is formed at least at a partial area thereof with a ferrite to absorb an electromagnetic wave, or is coated at an inner surface thereof with a ferrite.

16. The camera module of claim 1, comprising a cable electrically conducted to the second substrate unit and extended to outside of the second housing.

17. A camera module, the camera module comprising:
   a lens unit;
   a first housing including an opening unit accommodating at least a part of the lens unit and a through hole passing through the opening unit distanced from the opening unit;
   a first substrate unit disposed in the first housing;
   an image sensor mounted at the first substrate unit;
   a second housing coupled to the first housing; and
   a second substrate unit disposed at in the second housing and electrically connected to the first substrate unit, wherein
   an inner space of the first housing and an inner space of the second housing are communicated through the through hole, and the second housing has flexibility at least at a partial area thereof;
   wherein a size of the through hole is smaller than that of the opening unit.

18. A vehicle camera, the vehicle camera comprising:
   a lens unit;
   a first housing coupled to the lens unit;
   a first substrate unit that has an image sensor mounted thereon and is disposed in the first housing;
   a second housing that is coupled to the first housing and has flexibility on at least a partial area thereof; and
   a second substrate unit that is disposed in the second housing and is electrically connected to the first substrate unit;
   wherein the first housing includes a through hole formed at a part of one lateral surface, and a cross-sectional area of an inner space at the second housing corresponds to a cross-sectional area of the through hole.

* * * * *